United States Patent [19]

Haas et al.

[11] 4,228,191

[45] Oct. 14, 1980

[54] MICROBIOLOGICAL DECAFFEINATION OF AQUEOUS LIQUIDS

[75] Inventors: Gerhard J. Haas, Woodcliff Lake, N.J.; Barry Stieglitz, Montreal, Canada

[73] Assignee: General Foods Corporation, White Plains, N.Y.

[21] Appl. No.: 947,952

[22] Filed: Oct. 2, 1978

Related U.S. Application Data

[63] Continuation of Ser. No. 570,286, Apr. 21, 1975, abandoned.

[51] Int. Cl.$^2$ ............................................. A23F 1/10
[52] U.S. Cl. ..................................... 426/45; 435/267
[58] Field of Search ................... 195/2, 51 R; 426/45

[56] References Cited

U.S. PATENT DOCUMENTS 3,749,584   7/1973   Kurtzman et al. ................. 195/2 X

OTHER PUBLICATIONS

Lismanis et al., Metabolism of Caffeine in Microorganisms, Uch Zap., Latv. Gos. Univ. 1973, 191, 71–76 (Russ.).

Woolfolk, Metabolism of N-Methyl Purines by a *Pseudomonas putida* Strain Isolated by Enrichment on Caffeine as the Sole Source of Carbon and Nitrogen, Journal of Bacteriology, Sep. 1975, pp. 1088–1106.

*Primary Examiner*—Joseph M. Golian
*Attorney, Agent, or Firm*—Thomas R. Savoie; Bruno P. Struzzi

[57] ABSTRACT

Aqueous caffeine-containing liquids, such as coffee extracts, are decaffeinated by means of fermenting the liquid with Pseudomonad microorganisms of the type *Pseudomonas putida*, NRRL B-8051, *Pseudomonas fluorescens*, NRRL B-8052 and *Pseudomonad fluorescens*, NRRL B-8053 or by means of contacting the liquid with a caffeine metabolizing enzyme preparation isolated from Pseudomonad microorganisms of the aforementioned type.

3 Claims, No Drawings

MICROBIOLOGICAL DECAFFEINATION OF AQUEOUS LIQUIDS

This is a Continuation, of application Ser. No. 570,286, filed Apr. 21, 1975 and now abandoned.

BACKGROUND OF THE INVENTION

This invention relates to a process for decaffeinating aqueous liquids of vegetable origin. The invention is described with particular emphasis on the decaffeination of coffee extract, however decaffeination of other caffeine-containing aqueous liquids, such as tea, mate and the like, may be possible.

Current commercial decaffeination of coffee is effected by the removal of caffeine from whole, green coffee beans. The beans are first moistened and then extracted with a solvent which is relatively specific for caffeine. Typically the solvent may be either a chlorinated hydrocarbon sclvent, such as discussed in U.S. Pat. No. 3,700,465, or a caffeine-deficient water solution of coffee solubles, such as disclosed in U.S. Pat. No. 2,309,092. The processes described in these two patents, herein incorporated by reference, are well-known in the art.

Decaffeination of an aqueous extract obtained from roasted coffee beans by directly contacting the extract with a chlorinated solvent is also known in the coffee art, as disclosed in U.S. Pat. No. 2,933,395. The decaffeinated aqueous extract would then typically be dried, such as by spray-drying or freeze-drying, in order to obtain a decaffeinated soluble coffee.

Coffee beans or extract decaffeinated in accordance with above-described processes have been found to undergo changes which are readily detectable when one compares the taste of coffee beverages produced from decaffeinated coffee beans or extract with their caffeinated couterparts. Additionally, the decaffeinated coffee beans or extract which has been contacted either directly or indirectly with a hydrocarbon solvent undesirably retain a small amount of the solvent.

Thus the coffee industry has sought alternative systems for decaffeination which will minimize or eliminate the above problems. U.S. Pat. No. 3,749,584 to Kurtzman et al. has disclosed a mold, *Penicillium crustosum*, for the biological decaffeination of coffee; however the procedure of this patent which uses intact mold organisms as the caffeine metabolizing agent with the subsequent removal of these cells from the liquid or beverage is not seen to be acceptable for the commercial preparation of coffee products. Separation of the live cells from the decaffeinated liquid would likely be an expensive and/or lengthy operation, since all or substantially all of the cells would have to be removed to produce a commercially acceptable product. Binding of intact organisms into an insoluble support would be one means of eliminating the separation step and increasing the practicality of such an intact organism process. However, the use of the intact mold organisms may produce off-flavors within the coffee extract since chemical changes other than decaffeination could be produced by the organisms.

DESCRIPTION OF THE INVENTION

This invention relates to the use of Pseudomonad organisms or enzyme preparations isolated therefrom for decaffeinating aqueous liquids. Pseudomonad organisms which can be used in this invention are those which have the ability to use caffeine as a source of carbon and/or nitrogen for growth. Suitable microorganisms have been isolated from soil enriched with caffeine. Pseudomonad organisms proven acceptable for use in this invention have been irrevocably deposited in the permanent culture collection of The Northern Regional Research Laboratories of the U.S. Department of Agriculture at Peoria, Illinois, 61604, where they are available to anyone under the ascension numbers NRRL B-8051, B-8052 and B-8053.

The caffeine-utilizing pseudomonad organisms may be immobilized on an insoluble support by such means as entrapment within cross-linked polymers, absorbtion onto water-insoluble supports, or other means recognized as useful by those skilled in the art. The immobilized organism can then be used in columns or stirred tank reactors without release of cellular material into the aqueous liquid.

The caffeine-utilizing enzymes can be isolated from the pseudomonad microorganisms by first disrupting, such as by ultrasonic means, the whole cell organisms and then centrifuging to obtain a cell-free, enzyme-containing extract. The reaction between caffeine and the caffeine-utilizing enzyme preparations preferably takes place in the presence of a reduced coenzyme, such as reduced diphosphopyridine nucleotide (DPNH).

Other procedures which may be used for disrupting pseudomonad microorganisms and which will be apparent to those skilled in the art are; (1) agitation with glass beads, wherein disruption of the microorganisms is due to shear force (instruments commonly used are the Braun Homogenizer, Waring Blendor and various colloid mills); (2) pressure extrusion by liquid pressing, (instruments commonly used are the French Press and Ribi Press); (3) pressure extrusion by freeZe pressing (instruments commonly used are the Hughes Press and X-Press).

The first breakdown product produced from caffeine by the aforementioned organisms and enzyme preparations is theobromine (3,7-dimethylxanthine) as determined by incubating the enzyme-preparation with radioactively labelled caffeine (caffeine-1-methyl $^{14}$C) followed by thin layer chromatography (TLC) analysis. This analysis was confirmed by the fact the resulting demethylated product contained no radioactivity.

The breakdown of caffeine to theobromine was further corroborated by the following observations. A caffeine-enzyme preparation-DPNH incubation mixture was mixed with theobromine and chromatographed; only one spot resulted showing identity between the unknown and theobromine. Similarly, non-identity was established between the unknown and theophylline. This breakdown of caffeine to theobromine makes the Pseudomonad caffeine-degrading pathway of this invention distinct from that stipulated by Kurtzman and Schwimmer (U.S. Pat. No. 3,749,584) for *Pennicillium crustosum*, strain NRRL-5452.

As previously mentioned, the Pseudomonad organisms of this invention and their enzymatic preparations are useful for decaffeinating aqueous liquids and the process of this invention may be employed for decaffeinating water extracts of green or roasted coffee or liquid extracts obtained by dissolving soluble coffee material in water. Decaffeination may proceed either as a batch or continuous operation.

In addition to conventional means of enzyme addition, one could also employ attachment of the enzyme preparation onto insoluble supports. The enzyme attachment could be accomplished by covalent chemical attachment, entrapment within cross-linked polymers or adsorbtion onto water-insoluble supports. The immobilized enzyme preparation could then be used in columns or stirred tank reactors just as the immobilized organisms referred to above.

It would also be possible to perform decaffeination by keeping the enzyme preparation separate from the caffeine containing liquid either by entrapping the enzyme preparation within a permanent semi-permeable membrane (e.g., microencapsulation) or by means of enzyme reactor system wherein the enzyme preparation (either free or immobilized) is retained in an ultrafiltration or hollow fiber device.

In the practice of the enzymatic decaffeination process of this invention, the enzyme preparation would typically be incorporated into or contacted with the aqueous, caffeine-containing liquid and the caffeine metabolized under conditions generally employed in enzymatic reactions. When the DPNH coenzyme is used, the proportion of enzyme to DPNH to caffeine may be varied depending on the purity of the enzyme and time desired for the reaction. Caffeine concentration typically will be about 0.1 mg/ml to 20 mg/ml. Aerobic conditions are employed in the enzymatic reaction such as by exposing the reaction mixture to air or, if the reaction is carried out in a deep layer of liquid, by agitation of or bubbling air through the liquid.

DPNH may be replaced by the coenzyme reduced triphosphopyridine nucleotide (TPNH). Although sodium dithionite is not a suitable replacement for DPNH, other organic or inorganic reducing agents may be useful.

The reaction is carried out at temperatures conventionally used for microbiological reactions. Temperatures from about 20° to 45° C. may be employed; however, optimum decaffeination is achieved at 20° to 35° C. Decaffeination in our experiments was carried out at pH values of 6.0 to 9.0; however, by suitable selection of a solid support for enzyme immobilization the pH range may be extended to a lower level.

After the enzyme reaction is carried out, the enzymes can be inactivated by heating.

Thin-layer chromatography of cell-free supernatants of the caffeine-utilizing Pseudomonad organisms of this invention shows the presence of 7-methylxanthine and xanthine as well as theobromine. This suggests that the caffeine is metabolized by first removing the 1-methyl then the 3-methyl and finally the 7-methyl group. As will be apparent, the Pseudomonad organisms and enzymes preparations of this invention may be used not only for the purpose of decaffeinating aqueous solutions but also for converting caffeine to other compounds such as theobromine and 7-methylxanthine.

EXAMPLE 1

(Isolation of Microorganisms)

An aqueous solution of caffeine was poured onto a soil sample each weekday for a period of two weeks. Two grams of this soil was then added to 100 mls of an enrichment medium, having caffeine as the sole source of carbon. Incubation was carried out at room temperature (about 25° C.) and at a final pH of 6.5. Cultures of the organisms identified for use in this invention have the ascension numbers of NRRL B-8051, B-8052 and B-8053.

EXAMPLE 2

(Culturing of Microorganisms)

Organisms NRRL B-8051, B-8052 and B-8053 were cultured on a medium of the following composition: $CaCl_2$-0.08 g; KCl-0.37 g; $MgSO_4$-0.10 g; $KH_2PO_4$-0.67 g; $NaHPO_4$-0.71 g; $FeCl_3$-5 mg; basic salts - 10μg of $H_3Bo_3$, $Co(NO_3)_2$, $CuSO_4$, $MnSO_4$, $Na_2MoO_4$ and $ZnSO_4$; caffeine - 10g; and distilled water to one liter.

Growth of the microorganisms was carried out in a Microferm fermentor (model MF 114) under aerobic conditions and at about 30° C. and a pH of 6.6 to 6.9 after 36 hours of growth, another 1% caffeine by weight was added and fermentation was continued for another 36 hours. The bacterial cells were then harvested by centrifuging for 30 minutes at 6500×g at 4° C.

EXAMPLE 3

(Classification of NRRL-B-8051, B-8052 and B-8053)

The caffeine-utilizing pseudomonads of this invention have the following characteristics:

| Test | NRRL - B-8051 | NRRL - B-8052 | NRRL - B-8053 |
|---|---|---|---|
| General Description | Gram negative, short rods with rounded ends singly or in pairs. | Gram negative, short rods with rounded ends singly or in pairs. | Gram negative, short rods with rounded ends singly or in pairs. |
| Agar colonies[a] | Small, circular, opaque off-white, raised, glistening. | Small, circular, opaque off-white, raised, glistening. | Small circular, opaque off-white, raised, glistening. |
| Pigment production[b] | Slight green-yellow. | Slight green-yellow. | Heavy green-yellow. |

[a]-on a caffeine-salts agar
[b]-on a caffeine-salts medium

Further classification of these organisms was accomplished using the API 20 Enteric System (Analytab Products Inc., Carle Place, N.Y. 11514). The API 20E system consists of biochemical tests for differentiation and identification of Enterobacteriaceae species and other gram-negative microorganisms. The system monitors the performance of bacteria in 22 standard biochemical tests. The following results were obtained:

| A.P.I. 20E Tests[c] | | | |
|---|---|---|---|
| | B-8051 | B-8052 | B-8053 |
| B-galactosidase | − | − | − |
| Arginine dehydrolase | + | + | + |
| Lysine decarboxylase | − | − | − |
| Ornithine decarboxylase | − | − | − |
| Citrate | + | + | + |
| $H_2S$ production | − | − | − |
| Urease | − | − | − |
| Tryptophan deaminase | − | − | − |
| Indole | − | − | − |
| Acetoin | − | − | − |
| Gelatin liquification | − | − | − |
| Glucose | + | + | + |
| Mannitol | − | − | − |
| Inositol | − | − | − |
| Sorbitol | − | − | − |

| -continued | | | |
|---|---|---|---|
| | A.P.I. 20E Tests[c] | | |
| | B-8051 | B-8052 | B-8053 |
| Rhamnose | − | − | − |
| Sucrose | − | − | − |
| Malibiose | + | − | − |
| Amygdalin | − | − | − |
| Arabinose | − | − | − |
| Nitrite reduction | −[d] | −[d] | −[d] |
| Oxidase | + | + | + |

[c]-All tests were performed in duplicate at both 30° C. and 37° C.
[d]-N$_2$ gas produced.

Using the A.P.I. selector as well as Bergey's Manual of Determinative Bacteriology, NRRL B-8051 was tentatively identified as *Pseudomonas putida* and NRRL B-8052 and NRRL B-8053 were tentatively identified as members of *Pseudomonas fluorescens* group. (Note - Only difference between NRRL B-8052 and NRRL B-8053 is the intensity of pigment production on caffeine-salts medium.)

The above-characterized Pseudomonad organisms are seen to differ among themselves in only one out of the twenty-two biochemical tests of the API 20E system. Pseudomonad organisms and mutants thereof which are functionally equivalent to NRRL B-8051 in at least 21 out of 22 biochemical tests of the API 20E systems are contemplated for use in this invention.

EXAMPLE 4

(Decaffeination of aqueous solution with Pseudomonad organisms)

Three 50 ml. samples of a 1% caffeine solution were respectively inoculated with a 2% exponentially growing culture of NRRL B-8051, B-8052 and B-8053. The growth medium for the caffeine-degrading Pseudomonad was the 1% caffeine-salts medium of Example 2 and the final pH of the growth medium was 6.9. Growth was carried out at 30° C. with agitation on a gyratory shaker at 200–250 cycles/minute. After 48 hours a sample of the three cultures was analyzed for caffeine by thin-layer chromatography. Analysis revealed that less than 0.01% caffeine remained in each of the three culture samples.

EXAMPLE 5

(Enzyme Isolation from NRRL B-8051)

The caffeine-utilizing Pseudomonad NRRL B-8051 was disrupted as follows: 0.7 to 1.0 g of wet weight cells was resuspended in 13 ml. of 0.05 m phosphate buffer pH 6.9 containing 0.05 mg/ml caffeine. The vessel containing the cell suspension was placed in an ice-water bath. The cell-suspension was sonicated with a Sonifier Cell Disruptor-Model W185D (Heat Systems Untrasonics Inc., Plainsview, N.Y.) for five 12 second blasts at a power output of 100 watts with intermittent cooling periods (5 min.) between each sonic blast. Following sonication, the disrupted cells were centrifuged at 17,000×g for 45 minutes at 4° C. and the resulting supernatant was passed through a 0.45 micron membrane filter to give a cell-free enzyme preparation.

EXAMPLE 6

(Enzymatic Decaffeination of Caffeine Solution)

Five mg. of DPNH was added to 0.5 mg. caffeine and a 0.5 ml. volume of the crude-enzyme extract of Example 5 containing at least 2.5–3.0 mg. protein; the final pH of the reaction mixture was 6.7. After 2 hours of incubation at 30° C., analysis of the enzymatic reaction mixture revealed that 50–75% of the caffeine had been degraded and that theobromine was present; after 15 hours of incubation under the above conditions, over 99.9% of both the caffeine and the theobromine derived from caffeine degradation had been metabolized by the enzyme preparation.

EXAMPLE 7

(Enzymatic Decaffeination of Coffee Solution)

Aqueous coffee extracts containing 1% coffee solids were prepared using a variety of materials as the source of coffee solids. One-half milliliter of the crude-enzyme extract of Example 5 (2.5 to 3.0 mg. protein/ml.) was added to 0.5 ml. of the coffee extract (1% solids), followed by the addition of 10 mg. (0.2 ml.) of DPNH. After 15 hours of incubation at pH 6.2 to 6.5 and 30° C., the solutions were analyzed for caffeine content and the percent decaffeination was obtained as follows:

| Coffee Solution | % Decaffeination |
|---|---|
| Robusta R&G | 90 |
| Brazilian R&G | 55 |
| Columbian R&G | 25 |
| Commercial Spray-dried | 30 |

Having thus described the invention what is claimed is:

1. A method for reducing the caffeine content of an aqueous caffeine-containing extract of green or roasted coffee comprising the step of:
 (a) disrupting whole cell Pseudomonad organisms, said organisms being selected from the group consisting of Pseudomonad putida, NRRL B-8051 Pseudomonad fluorescens, NRRL B-8052 and Pseudomonad fluorescens, NRRL B-8053 and combinations thereof,
 (b) separating a cell-free, enzyme-containing extract from the cellular material, and
 (c) contacting, under aerobic conditions and in the presence of reduced diphosphopyridine nucleotide, a caffeine-containing solution with the enzymes contained in the extract of step b) for a period of time sufficient to obtain substantial reduction in the caffeine content of the solution.

2. The method of claim 1 wherein the Pseudomonad organism is Pseudomonas putida, NRRL B-8051.

3. The method of claim 2 wherein the enzymes are immoblized on an insoluble support.

* * * * *

UNITED STATES PATENT AND TRADEMARK OFFICE
CERTIFICATE OF CORRECTION

PATENT NO. : 4,228,191
DATED : October 14, 1980
INVENTOR(S) : G. J. Haas et al.

It is certified that error appears in the above-identified patent and that said Letters Patent are hereby corrected as shown below:

In column 2, line 35, change "freeZe" to -- freeze -- ; line 56, change "Pennicil-" to -- Penicil- -- .

In column 4, line 6 after "100", change "mis" to -- mls -- .

In column 5, line 7, change "Malibiose" to -- Melibiose -- .

Signed and Sealed this

Sixth Day of October 1981

[SEAL]

Attest:

Attesting Officer

GERALD J. MOSSINGHOFF

Commissioner of Patents and Trademarks